Nov. 26, 1929.  H. ALBERTINE  1,737,399
RESERVOIR GREASE GUN
Filed April 26, 1926
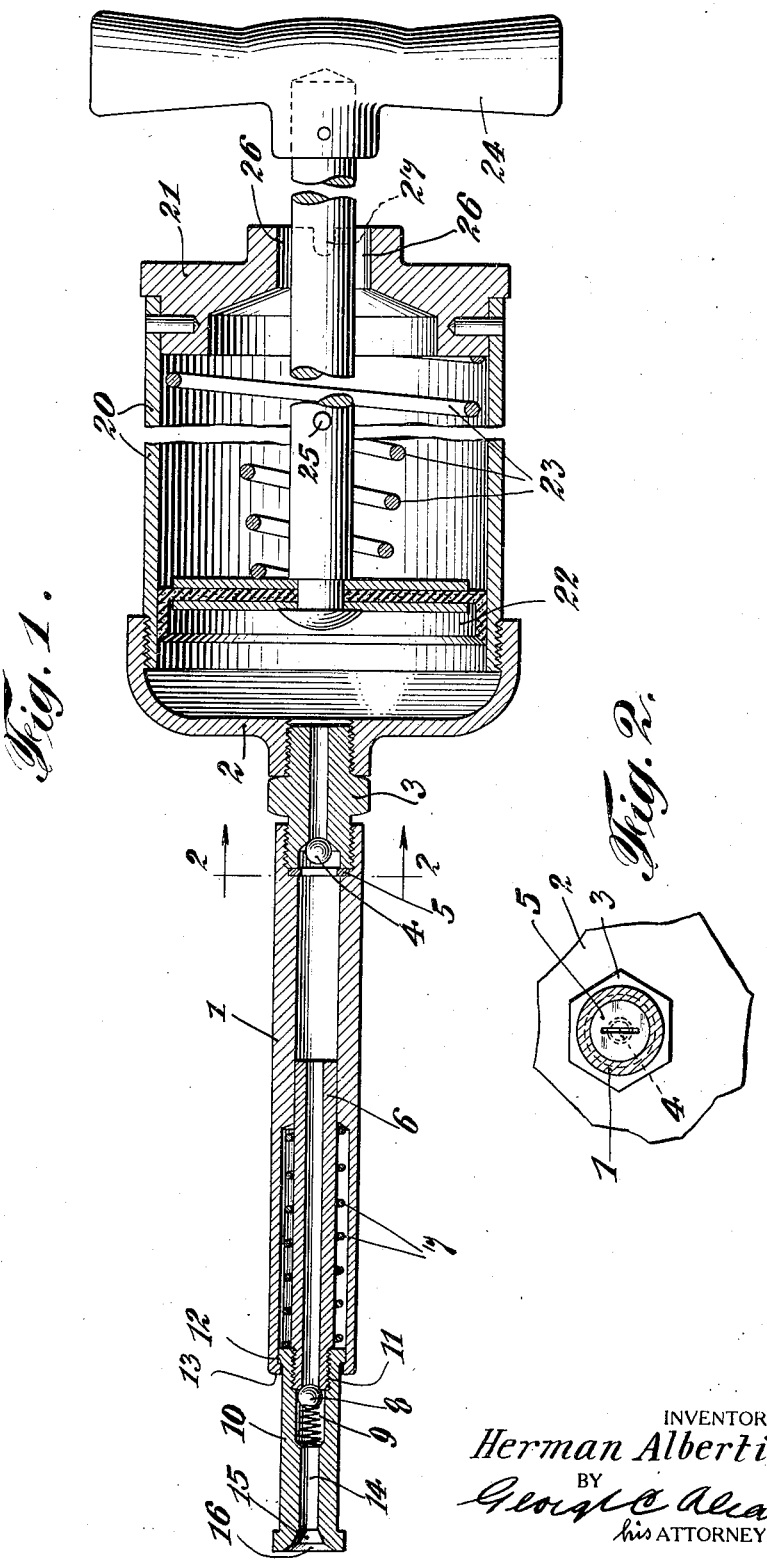
INVENTOR
*Herman Albertine*
BY
*George C. Alcan*
his ATTORNEY Patented Nov. 26, 1929

1,737,399

UNITED STATES PATENT OFFICE

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY

RESERVOIR GREASE GUN

Application filed April 26, 1926. Serial No. 104,556.

My present invention is shown as embodied in an apparatus that includes a nozzle or coupling in combination with a grease gun, for forcing grease through the ducts of bearings on automobiles and other machinery, particularly in cases where the duct inlets are normally closed by nipples having ball inlet check valves, as in expired British patent to Alley and Woodvine, No. 21,893, of 1906, Oct. 4.

My present invention does not necessarily require that the nipples be exteriorly screw-threaded, as in said British patent, or that they be provided with equivalent bayonet securing means, as in many other patents, as there are various other forms of nipples and ducts, with and without securing means and valves, for which the novel features of my device may be readily adapted. In fact, my invention is best applied in connection with guns for pumping grease directly into a nipple, by reciprocating the reservoir end of the device, and there is decided advantage in having no securing means whatever, the charging nozzle being held in face contact with the end of the nipple. Thus, when the reservoir part is manually reciprocated and slides longitudinally on the nozzle stem, the latter will be free for slight angular yield, thus avoiding lateral strains such as ordinarily result from the hand reciprocation, if the stem were held in rigid alignment with the nipple.

Prior devices of the above type, so far as I am aware, have been more or less complicated and have been arranged so that the telescoping nozzle member of the pump reciprocates backward into the body of grease in the reservoir and the parts are so arranged that there is very substantial vacuum condition produced on each pumping stroke. Both of these features tend to draw dirt into the sliding joints and into the body of grease in the reservoir. All of these disadvantages are avoided by my present invention and far quicker and more certain supply of the grease to the pumping cavity or cylinder element is assured.

The above and other features of my invention may be more fully understood from the following description in connection with the accompanying drawings, in which Fig. 1 shows one form of grease gun and pumping nozzle in longitudinal section, ready for application to the end of a grease duct or to a nipple through which the lubricant is to be forced; and Fig. 2 is a detail section on the line 2—2, Fig. 1.

In these drawings, the cylinder member, 1, of my pump is shown as rigidly mounted on the end, 2, of a grease reservoir by means of a coupling member, 3, at the outer end of which is a ball check, 4, held in place by a disc, 5, slitted as shown in Fig. 2 to permit passage of the grease. The tube, 6, which is the piston member of the pump reciprocating in the cylinder 1, is surrounded by a spring, 7, normally returning it to the forward or retracted position. There is an outlet check valve, 8, at the exit end of the piston tube, housed in an enlargement, 9, of the nozzle member, 10, which is secured to the forward end of the piston, 6, by screw-thread, 11, and is provided with shoulders, 12, affording a guide for this end of the piston and also serving as an abutment for thrust of spring 7. The shoulder, 12, is shown as having its outward movement limited by a spun in annulus, 13, at the forward end of the cylinder element 1.

This nozzle element, 10, is formed with an axial passage, 14, which terminates at its forward end in a flaring cone, 15, adapted for endwise engagement with the inlet end of the nipple into which the grease is to be pumped, and said cone is preferably surrounded by still flatter cone surface, 16, which is useful as an assistance in guiding the nozzle cone, 15, into operative engagement with said end of the nipple.

The grease reservoir may be of any desired construction and is conventionally shown as including a cylinder, 20, detachably screwed into the end closure, 2, and permanently closed at the other end by plug, 21. Within the cylinder, I preferably provide a piston, 22, against which the grease is packed in the initial charging of the device. While the pump will operate by its own suction to draw a supply from such reservoir, I prefer to have the piston backed by a spring, 23, and there may be a handle as 24, for retracting the piston when the reservoir is to be filled with grease.

In operation, the pressure of the piston against the grease, assisted by a few reciprocations of the nozzle and tubular piston element will serve to fill the entire pump nozzle with grease.

A convenient way of working the device for filling the grease ducts of an automobile or other machine, is to grasp the reservoir cylinder, 20, in one hand and the pump cylinder, 1, in the other hand. The cone, 15, is then pressed against the end of a nipple fitting such as is commonly used on such grease ducts, although, of course, screw fittings or other coupling means can be employed if desired. Thereupon, the nozzle being held against endwise movement, and the rest of the structure being pushed forward, the cylinder, 1, will be pushed along the piston 6, compressing the spring 7 and expelling grease past the outlet check valve, 8, and through the nozzle orifice at 15. The hand pressure being then relieved, the spring, 7, will continue holding the nozzle in firm contact with the nipple, while the cylinder element, 1, is being retracted. At the beginning of the retracting movement, the outlet check valve, 8, will automatically seat and inlet check 4 will automatically open, whereupon the pressure applied upon the grease in the reservoir by spring 23 through piston 22 will operate to feed grease into the cylinder cavity until the retraction movement is completed. Thereupon, a second forcing movement will automatically cause closure of valve 4 and opening of valve 8, as first above described.

Preferably, the pressure applied by the spring 23 on the grease of the reservoir will be sufficient to very materially assist the filling of the pump cylinder, 1, in response to the suction of the piston, 6, and a desirable feature being that it is effective for this purpose during the entire retracting stroke instead of at the end of the stroke, as in certain prior devices. If it is desired to use the device with a very powerful spring, or with a thin lubricant having small flow resistance, it is a simple matter to relieve the lubricant in the reservoir from the pressure of piston 22, by retracting it, to draw a locking pin, 25, through the slots, 26, and then rotate the handle a half turn to bring the pin 25 into locking engagement with the slot 27, which is shown in dotted line.

It will be evident that the moving element, the piston, in my pump, cannot possibly deliver dirt into the grease reservoir. Moreover, if any dirt can find its way past the bearing surface of shoulder 12, no harm can result, certainly not for a very long time, because it would have to work its way the length of the spring cavity before it could even reach the piston head. If it should reach this point, it is practically impossible for it to penetrate farther inward, because the only time the piston travels inward in the proper direction, the internal cavity is subject to the great internal pressure applied on the grease, and if there is any leakage, it will be outward leakage of grease, tending to carry dirt away from the interior.

I claim:

Lubricating means, including a reservoir and piston means for force feeding grease through a non-return valve and into a pump cylinder of relatively small internal diameter having an extension guide portion of larger diameter affording an intermediate annular shoulder, and, in combination with said parts, a correlatively shaped piston tube having its inlet end slidably engaging within said pump cylinder and an annular enlargement slidably fitting within said cylinder enlargement; a spiral thrust spring surrounding and closely embracing the exterior of, the piston tube and positioned within the cylinder enlargement and compressed between the cylinder shoulder and the piston enlargement to press the piston outward; a non-return valve for the outlet of the piston passage and a terminal thrust surface for engagement with and thrust against a device to be lubricated.

Signed at New York city in the county of New York and State of New York, this 22 day of April, A. D. 1926.

HERMAN ALBERTINE.